(12) United States Patent
Morgan et al.

(10) Patent No.: US 10,066,146 B2
(45) Date of Patent: Sep. 4, 2018

(54) WELLBORE SERVICING COMPOSITIONS AND METHODS OF MAKING AND USING SAME

(71) Applicant: Halliburton Energy Services, Inc., Houston, TX (US)

(72) Inventors: Ronnie Glen Morgan, Waurika, OK (US); Robert Lee Browning, Spring, TX (US); Marcus Allen Duffy, Spring, TX (US); Chase Russell Gamwell, Spring, TX (US); Robert Phillip Darbe, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 600 days.

(21) Appl. No.: 13/923,486

(22) Filed: Jun. 21, 2013

(65) Prior Publication Data
US 2014/0374097 A1 Dec. 25, 2014

(51) Int. Cl.
| | |
|---|---|
| *C09B 7/02* | (2006.01) |
| *C09K 8/42* | (2006.01) |
| *C09K 8/44* | (2006.01) |
| *C09K 8/467* | (2006.01) |
| *C04B 28/02* | (2006.01) |
| *C04B 20/00* | (2006.01) |

(52) U.S. Cl.
CPC .......... *C09K 8/426* (2013.01); *C04B 20/0048* (2013.01); *C04B 28/02* (2013.01); *C09K 8/44* (2013.01); *C09K 8/467* (2013.01); *C09K 2208/08* (2013.01); *Y02W 30/92* (2015.05)

(58) Field of Classification Search
CPC ........ C04B 7/02; C04B 22/0033; C04B 14/44

USPC ................................................. 166/293, 285
See application file for complete search history.

(56) References Cited

U.S. PATENT DOCUMENTS

| | | | |
|---|---|---|---|
| 3,108,979 A | 10/1963 | Le Fevre et al. | |
| 3,399,159 A | 8/1968 | Samour | |
| 3,616,589 A | 11/1971 | Sherard | |
| 3,793,244 A | 2/1974 | Megee | |
| 3,852,930 A | 12/1974 | Naaman | |
| 4,224,377 A * | 9/1980 | Moens ................... | C04B 14/48 428/369 |

(Continued)

FOREIGN PATENT DOCUMENTS

| | | |
|---|---|---|
| EP | 1375773 A2 | 1/2004 |
| EP | 1375773 A3 | 2/2004 |

(Continued)

OTHER PUBLICATIONS

Foreign communication from a related counterpart application—International Search Report and Written Opinion, PCT/US2014/041316, dated Sep. 3, 2014, 8 pages.

(Continued)

*Primary Examiner* — William D Hutton, Jr.
*Assistant Examiner* — Ashish K Varma
(74) *Attorney, Agent, or Firm* — Craig Roddy; Baker Botts L.L.P.

(57) ABSTRACT

A method of servicing a wellbore in a subterranean formation comprising preparing a wellbore servicing fluid comprising a sealant material, helical fibers and a base fluid, placing the wellbore servicing fluid in the wellbore and/or subterranean formation, and allowing the wellbore servicing fluid to set therein.

19 Claims, 3 Drawing Sheets

Neat

Ultra-Short (56) References Cited

U.S. PATENT DOCUMENTS

| | | | |
|---|---|---|---|
| 4,560,736 A | 12/1985 | Pischke et al. | |
| 4,565,840 A * | 1/1986 | Kobayashi | C04B 16/0625 |
| | | | 428/399 |
| 4,585,064 A | 4/1986 | Graham et al. | |
| 4,791,161 A | 12/1988 | Leising | |
| 4,861,822 A | 8/1989 | Keskey et al. | |
| 5,293,938 A | 3/1994 | Onan et al. | |
| 5,330,005 A | 7/1994 | Card et al. | |
| 5,346,012 A | 9/1994 | Heathman et al. | |
| 5,362,542 A | 11/1994 | Ozawa et al. | |
| 5,439,055 A | 8/1995 | Card et al. | |
| 5,486,557 A | 1/1996 | Akerberg | |
| 5,501,275 A | 3/1996 | Card et al. | |
| 5,563,201 A | 10/1996 | Joanicot et al. | |
| 5,588,488 A | 12/1996 | Vijn et al. | |
| 5,599,599 A | 2/1997 | Mirmiran et al. | |
| 5,865,000 A | 2/1999 | Nemegeer et al. | |
| 5,913,364 A | 6/1999 | Sweatman | |
| 6,167,967 B1 | 1/2001 | Sweatman | |
| 6,172,011 B1 | 1/2001 | Card et al. | |
| 6,220,354 B1 | 4/2001 | Chatterji et al. | |
| 6,258,757 B1 | 7/2001 | Sweatman et al. | |
| 6,308,777 B2 | 10/2001 | Chatterji et al. | |
| 6,321,841 B1 | 11/2001 | Eoff et al. | |
| 6,419,019 B1 | 7/2002 | Palmer et al. | |
| 6,457,524 B1 | 10/2002 | Roddy | |
| 6,500,252 B1 | 12/2002 | Chatterji et al. | |
| 6,582,819 B2 | 6/2003 | McDaniel et al. | |
| 6,664,215 B1 | 12/2003 | Tomlinson | |
| 6,677,426 B2 | 1/2004 | Noro et al. | |
| 6,722,433 B2 | 4/2004 | Brothers et al. | |
| 6,773,500 B1 | 8/2004 | Creamer et al. | |
| 6,881,708 B2 | 4/2005 | Reddy et al. | |
| 6,957,702 B2 | 10/2005 | Brothers et al. | |
| 6,962,201 B2 | 11/2005 | Brothers | |
| 7,044,222 B2 | 5/2006 | Tomlinson | |
| 7,077,203 B1 | 7/2006 | Roddy et al. | |
| 7,143,827 B2 | 12/2006 | Chatterji et al. | |
| 7,143,828 B2 * | 12/2006 | Reddy | C04B 24/2641 |
| | | | 166/294 |
| 7,153,575 B2 | 12/2006 | Anderson et al. | |
| 7,174,961 B2 | 2/2007 | Chatterji et al. | |
| 7,174,962 B1 | 2/2007 | Roddy et al. | |
| 7,217,441 B2 | 5/2007 | Bour et al. | |
| 7,267,873 B2 * | 9/2007 | Pilakoutas | E04C 5/012 |
| | | | 428/379 |
| 7,282,093 B2 | 10/2007 | Brothers et al. | |
| 7,331,391 B2 | 2/2008 | Keese et al. | |
| 7,351,279 B2 | 4/2008 | Brothers | |
| 7,441,600 B2 | 10/2008 | Brothers et al. | |
| 7,493,968 B2 * | 2/2009 | Reddy | C04B 14/38 |
| | | | 175/65 |
| 7,670,425 B2 | 3/2010 | Watanabe et al. | |
| 8,002,049 B2 | 8/2011 | Keese et al. | |
| 8,387,694 B2 | 3/2013 | Dalrymple et al. | |
| 2013/0324643 A1 | 12/2013 | Tanaka et al. | |

FOREIGN PATENT DOCUMENTS

| | | |
|---|---|---|
| EP | 2273027 A1 | 1/2011 |
| WO | 9958467 A1 | 11/1999 |
| WO | 0066878 A1 | 11/2000 |
| WO | 2004094778 A1 | 11/2004 |
| WO | 2005100739 A1 | 10/2005 |
| WO | 2010086592 A1 | 8/2010 |

OTHER PUBLICATIONS

Smith, Dwight K., "Cementing," 1990, p. 36, Henry L. Doherty Memorial Fund of AIME, Society of Petroleum Engineers, Inc.

Halliburton brochure entitled "Latex 2000, Cement Additive," Cementing, Aug. 2007, 2 pages, Halliburton.

Halliburton brochure entitled "Spherelite#, Cement Additive," Cementing, Mar. 2012, 1 page, Halliburton.

Halliburton brochure entitled "ThermaLock™ Cement, for Corrosive $CO_2$ Environments," Cementing, Apr. 2006, 2 pages, Halliburton.

Halliburton brochure entitled "Thermatek," Termatek Service, Mar. 2009, 2 pages, Halliburton.

Halliburton brochure entitled "VersaSet, Thixotropic Additive," Cementing, Aug. 2007, 2 pages, Halliburton.

Halliburton brochure entitled "WellLife® 734 Additive," Cementing, May 2012, 1 page, Halliburton.

* cited by examiner

FIG. 1A Neat

FIG. 1B Ultra-Short

FIG. 1C Long Fiber

FIG. 1D Neat

FIG. 1E Ultra-Short

FIG. 1F Long Fiber

WELLBORE SERVICING COMPOSITIONS AND METHODS OF MAKING AND USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates to methods of servicing a wellbore. More specifically, it relates to methods of treating a wellbore with sealant compositions.

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a sealant composition (e.g., cement slurry) is placed in the annulus and permitted to set into a hard mass (i.e., sheath) to thereby attach the string of pipe to the walls of the wellbore and seal the annulus. Subsequent secondary cementing operations may also be performed.

During the life of a wellbore, sealant compositions (e.g., cements) are typically subjected to a wide variety of conditions (e.g., varying pressure and thermal ranges, cyclical changes in underground pressures and temperatures during production and shut-in stages, etc.), which may cause cracks and fractures in the sealant compositions (e.g., cements). To help alleviate this problem, conventional reinforcing materials may be added to wellbore sealant compositions (e.g., cements). However, once a crack forms in the sealant composition (e.g., cement), the changes in the wellbore environment (e.g., wellbore pressure and temperature), along with sustained reservoir pressures, may cause sealant composition (e.g., cement) fracturing and crack propagation by tensile and/or compressive failures within the sealant composition (e.g., cement). While conventional reinforcing materials help prevent to a certain extent the initiation of cracks and fractures in sealant compositions (e.g., cements), no conventional reinforcing materials commonly used in wellbore servicing operations help prevent fracturing, crack propagation, and failure after the initiation of cracks and fractures in sealant compositions (e.g., cements). Thus, an ongoing need exists for more effective compositions and methods of using sealant compositions in wellbores and/or subterranean formations.

SUMMARY

Disclosed herein is a method of servicing a wellbore in a subterranean formation comprising preparing a wellbore servicing fluid comprising a sealant material, helical fibers and a base fluid, placing the wellbore servicing fluid in the wellbore and/or subterranean formation, and allowing the wellbore servicing fluid to set therein.

Also disclosed herein is a method of servicing a wellbore in a subterranean formation comprising preparing a wellbore servicing fluid comprising a hydraulic cement, helical fibers and a base fluid; wherein the helical fibers have an aspect ratio of from about 10 to about 100 placing the wellbore servicing fluid in the wellbore and/or subterranean formation, and allowing the wellbore servicing fluid to set therein.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

Disclosed herein are wellbore servicing fluids or compositions (collectively referred to herein as WSFs) and methods of using same. In an embodiment, the wellbore servicing fluid may comprise a sealant material, helical fibers and a sufficient amount of a base fluid to form a pumpable WSF. In an embodiment, the wellbore servicing fluid may be placed (e.g., pumped) in the wellbore and/or subterranean formation, where it may be allowed to set (e.g., harden), thereby sealing at least a portion of the wellbore and/or subterranean formation.

In an embodiment, the WSF comprises a sealant material. Without wishing to be limited by theory, a sealant material may function to render sealing properties (e.g., block the flow of a fluid such as oil, gas, water, etc.), across a composition (e.g., a WSF) after such composition has set (e.g., hardened). In an embodiment, the sealant material comprises a cementitious material, a cementless material, or combinations thereof.

In an embodiment, the sealant material comprises a cementitious material. In an embodiment, the cementitious material comprises a hydraulic cement, which comprises calcium, aluminum, silicon, oxygen, and/or sulfur and which sets and hardens by reaction with water.

Nonlimiting examples of cementitious materials suitable for use in this disclosure include Portland cements, class A Portland cement, class B Portland cement, class C Portland cement, class G Portland cement, class H Portland cement; construction cements, type I construction cement, type II construction cement; pozzolanic cements; gypsum cements; shale cements; acid/base cements; phosphate cements, calcium phosphate cements; high alumina content cements; high alkalinity cements; magnesia cements; fly ash cements; zeolite cement systems; cement kiln dust cement systems; slag cements; micro-fine cements; metakaolin; silica cements, pumice, perlite, wollastonite, calcium silicate, tricalcium silicate, tricalcium metasilicate, amorphous silica, nano silica, rice husk ash; fluidized bed ash; magnesium oxychloride cements, Sorel cements, which typically comprise magnesium oxide and a chloride or phosphate salt which together form for example magnesium oxychloride; or combinations thereof. As will be apparent to one of skill in the art, and with the help of this disclosure, any cementitious material suitable for use in wellbore cementing operations may be included in the WSF compositions of this disclosure.

Nonlimiting examples of commercially available cementitious materials suitable for use in this disclosure include THERMALOCK cement, THERMATEK service, and MIKRODUR microfine cement. THERMALOCK cement is a specially formulated calcium phosphate cement that is both $CO_2$ and acid resistant; and THERMATEK service includes materials for plugging or temporarily isolating specific zones; both of which are available from Halliburton Energy Services, Inc. MIKRODUR microfine cement is blast furnace slag and Portland cement clinker blended with gypsum, and is commercially available from Dyckerhoff GmBH of Lengerich, Germany.

In an embodiment, the cementitious material of the type disclosed herein may be present within the WSF in an amount of from about 15 wt. % to about 90 wt. %, alternatively from about 30 wt. % to about 70 wt. %, or alternatively from about 40 wt. % to about 60 wt. %, based on the total weight of the WSF.

In an embodiment, the sealant material comprises a cementless material. In an embodiment, the cementless material comprises a latex sealant, a liquid rubber sealant (e.g., a latex), a resin sealant, an epoxy sealant, a silicone oil sealant (e.g., a polysiloxane), or combinations thereof.

In an embodiment, the latex sealant comprises a naturally-occurring material. Alternatively, the latex sealant comprises a synthetic material. Alternatively, the latex sealant comprises a mixture of a naturally-occurring and a synthetic material. In an embodiment, the latex sealant comprises a polymer, an alkali-swellable latex, a cationic latex, or combinations thereof.

In an embodiment, the latex comprises a polymer. Herein, the disclosure may refer to a polymer and/or a polymeric material. It is to be understood that the terms polymer and/or polymeric material herein are used interchangeably and are meant to each refer to compositions comprising at least one polymerized monomer in the presence or absence of other additives traditionally included in such materials. Nonlimiting examples of latex sealant polymers suitable for use in the present disclosure include homopolymers, copolymers, random, block, star- and hyper-branched polymers, derivatives thereof, and combinations thereof. The term "copolymer" as used herein is not limited to the combination of two polymers, but includes any combination of polymers, e.g., graft polymers, terpolymers and the like. The term "derivative" is defined herein to include any compound that is made from one of the listed compounds, for example, by replacing one atom in the listed compound with another atom or group of atoms, rearranging two or more atoms in the listed compound, ionizing one of the listed compounds, or creating a salt of one of the listed compounds.

In an embodiment, the latex sealant polymer comprises isoprene, styrene, chloroprene, acrylonitrile, acrylamide, N,N-dimethylacrylamide, butadiene, copolymers thereof, derivatives thereof, or combinations thereof. In an embodiment, the latex sealant polymer may be dispersed in water to form an aqueous emulsion. In an embodiment, the latex sealant polymer comprises a styrene/butadiene copolymer emulsion, polystyrene emulsion, emulsions of copolymers of styrene/butadiene and poly(acrylamido-2-methyl-propane sulfonate), poly(acrylamido-2-methyl-propane sulfonate) emulsion, emulsions of acrylamide and acrylamide derivative polymers and copolymers, poly(N,N-dimethylacrylamide) emulsion, polychloroprene emulsion, polyisoprene emulsion, acrylonitrile/butadiene emulsion, or combinations thereof. In an embodiment, the weight ratio of the styrene to a co-monomer (e.g., butadiene) is about 1:99, alternatively about 10:90, alternatively about 20:80, alternatively about 30:70, alternatively about 40:60, alternatively about 50:50, alternatively about 60:40, alternatively about 70:30, alternatively about 80:20, alternatively about 90:10, alternatively about 99:1. Alternatively, in an embodiment, the latex sealant polymer comprises 100% styrene.

In an embodiment, the latex sealant comprises an alkali swellable latex. "Alkali swellable latex" is defined herein as a latex emulsion that, when exposed to pH-increasing materials, may swell and exhibit an increase in viscosity. Alkali swellable latexes typically contain, in addition to typical latex-forming monomers, other monomers having acidic groups capable of reacting with pH increasing materials, thereby forming anionic pendant groups on the polymer back bone. Nonlimiting examples of typical latex-forming monomers that may be used to make alkali swellable latexes include vinyl aromatic monomers (e.g., styrene based monomers), ethylene, butadiene, vinylnitrile (e.g., acrylonitrile), olefinically unsaturated esters of $C_1$-$C_8$ alcohol, or combinations thereof. In some embodiments, non-ionic monomers that exhibit steric effects and that contain long ethoxylate or hydrocarbon tails may also be present.

Monomers containing acid groups capable of reacting with pH-increasing materials include ethylenically unsaturated monomers having at least one carboxylic acid functional group. Nonlimiting examples of such carboxylic acid containing groups include acrylic acid, alkyl acrylic acids, such as methacrylic acid and ethacrylic acid, alpha-chloroacrylic acid, alpha-cyano acrylic acid, alpha-chloro-methacrylic acid, alpha-cyano methacrylic acid, crotonic acid, alpha-phenyl acrylic acid, beta-acryloxy propionic acid, sorbic acid, alpha-chloro sorbic acid, angelic acid, cinnamic acid, p-chloro-cinnamic acid, beta-styryl acrylic acid, itaconic acid, maleic acid, citraconic acid, mesaconic acid, glutaconic acid, aconitic acid, fumaric acid, tricarboxy ethylene, or combinations thereof. In some embodiments, the carboxylic acid containing groups include itaconic acid, acrylic acid, or combinations thereof.

Nonlimiting examples of suitable commercially available alkali swellable latexes include TYCHEM 68710, available from Dow Reichhold Specialty Latex LLC; ACRYSOL TT 615, available from Rohm and Haas; SN THICKENERs 920, 922, 924, 634 and 636, available from San Napco Limited, Sanyo Chemical Industry, Japan; ALCOGUM SL-120, available from Alco Chemical, a National Starch Company; HEUR-ASE P206, available from Dow Chemical Company; ADCOTE 37-220, available from Rohm and Haas Company; and JETSIZE AE-75, available from Eka Chemicals.

An alkali swellable latex may contain crosslinking agents that are suitable for facilitating the formation of a resilient rubbery mass, which may be used during the polymerization stage of the monomers or added to the latex prior to use. In embodiments wherein the alkali swellable latex contains vulcanizable groups, such as the diene type of monomers, crosslinking agents including vulcanizing agents such as sulfur, 2,2'-dithiobisbenzothiazole, organic peroxides, azo compounds, alkylthiuram disulfides, selenium phenolic derivatives, and the like; vulcanization accelerators such as fatty acids (e.g, stearic acid), metallic oxides (e.g., zinc oxide), aldehyde amine compounds, guanidine compounds, disulfide thiuram compounds, and the like; vulcanization retarders such as salicylic acid, sodium acetate, phthalic anhydride and N-cyclohexyl thiophthalimide; defoamers; or combinations thereof, may be added just prior to use, for instance to a wellbore servicing fluid composition. If the crosslinking agent is used during production of the latex, it may be a multifunctional monomer with more than one polymerizable group, for example divinylbenzene, trimethylolpropane triacrylate, tetraethyleneglycol diacrylate, methylene bisacrylamide, and the like.

In an embodiment, the latex sealant comprises a cationic latex. In an embodiment, the cationic latexes comprise latex-forming monomers and positively charged monomers. Nonlimiting examples of latex-forming monomers suitable for use in the present disclosure include vinyl aromatic monomers (e.g., styrene based monomers), ethylene, butadiene, vinylnitrile (e.g., acrylonitrile), olefinically unsaturated esters of $C_1$-$C_8$ alcohols, non-ionic monomers that exhibit steric effects and that contain ethoxylate or hydrocarbon tails, or combinations thereof. In an embodiment, the positively charged monomers comprise monomers that already have a positive charge that cannot be neutralized at pH values greater than about 10, alternatively positively charged monomers which can be neutralized at pH values greater than about 10. Nonlimiting examples of positively charged monomers suitable for use in the present disclosure include monomers containing quaternary ammonium groups, trimethylaminopropylmethacrylamide bromide, monomers containing other -onium species, such as trialkylsulfonium or tetraalkylphosphonium structures, protonated tertiary amines, or combinations thereof. In an embodiment, the positively charged monomer comprises dimethylaminomethacrylamide, which when polymerized in an acidic medium becomes cationic by protonation of amine nitrogen.

A cationic latex may be prepared using any suitable methodology. For example, a cationic latex may be prepared by conventional emulsion polymerization using an azo initiator such as 2,2'-azobis(isobutylamidine hydrochloride). Alternatively, the cationic latex may be produced through the copolymerization of a latex with cationic or amine containing comonomers.

In an embodiment, the latex sealant may comprise at least one polar monomer and at least one elasticity-enhancing monomer. According to certain embodiments, the latex sealant further comprises at least one stiffness-enhancing monomer. In some embodiments, the polar monomer may comprise vinylamine, vinyl acetate, acrylonitrile, or acid, ester, amide, or salt forms of acrylates, such as acrylic acid, derivatives thereof, or combinations thereof; and the elasticity-enhancing monomer may comprise ethylene, propylene, butadiene, 1,3-hexadiene, isoprene, derivatives thereof, or combinations thereof. In the embodiments that include a stiffness-enhancing monomer, the stiffness-enhancing monomer may comprise styrene, t-butylstyrene, α-methylstyrene, sulfonated styrene, derivatives thereof, or combinations thereof.

In an embodiment, the latex sealant comprises LATEX 2000 cement additive or LATEX 3000 cement additive, which are commercially available from Halliburton Energy Services, Inc. LATEX 2000 cement additive is a liquid additive designed to impart excellent fluid-loss control, high-temperature suspension properties, and acid resistance to cement slurries. LATEX 3000 cement additive is a liquid additive designed to lower equivalent circulating density and impart excellent fluid-loss control, high-temperature suspension properties, and acid resistance to cement slurries.

Although the disclosure refers to a latex sealant as a polymer emulsion, in some embodiments, a latex sealant suitable for use in the present disclosure is a "solid latex." Herein, a "solid latex" refers to latex which is a free flowing particulate material that is substantially dry or free of fluid. Solid latexes may be prepared by removing water from any emulsion polymerized polymer systems such as described herein. Water may be removed from emulsion polymerized polymer systems using any suitable methodology such as spray drying. The solid latex may be rehydrated before and/or in the preparation of the WSF, for example by mixing the dry latex with a base fluid in the preparation of the WSF (e.g., an aqueous-based fluid).

In an embodiment, the latex sealant of the type disclosed herein may be present within the WSF in an amount of from about 0.1 wt. % to about 30 wt. %, alternatively from about 0.1 wt. % to about 10 wt. %, or alternatively from about 0.1 wt. % to about 5 wt. %, based on the total weight of the WSF.

In an embodiment, the resin sealant comprises a water-compatible, thermoset polymer-forming monomer/macromer system containing no olefinic unsaturation, referred to herein as a resin system. As used herein, the term "water compatible" means water soluble, water dilutable, or water dispersible and that the presence of water does not detrimentally affect the curing reactions. In an embodiment, the resin system comprises a resin formed from a formaldehyde condensation reaction with an amino resin or a furan resin, a curing agent for causing the resin system to cure, a coupling agent for bonding the WSF in a subterranean zone, and, optionally, a diluent. Nonlimiting examples of amino resin/formaldehyde condensation resins include urea-formaldehyde resins, melamine-formaldehyde resins. Nonlimiting examples of furan/formaldehyde resins include furfuryl alcohol/formaldehyde condensation resins. In an embodiment, the amino resin/formaldehyde resins and furfuryl alcohol/formaldehyde resins may be partially prepolymerized while retaining water compatibility.

The resin system may comprise polymerized furfuryl alcohol/aldehyde (i.e., furan-formaldehyde polymer) and non-polymerized (i.e., unreacted) furfuryl alcohol/aldehyde. The weight ratio of polymerized furfuryl alcohol/aldehyde to non-polymerized or unreacted furfuryl alcohol/aldehyde in the WSF may be chosen such that dilution with a base fluid (e.g., an aqueous base fluid) does not cause phase separation of the resin and base fluid, as may be determined experimentally for resins with varying degrees of polymerization.

As mentioned above, the resin system may comprise a curing agent, also known as a catalyst. A curing agent is herein defined as a material having the ability to cause the resin to cure after a latent period to a hard, resilient solid. As used herein, curing refers to polymerizing the non-polymerized resin fraction, as well as further polymerization of previously polymerized resin fraction, thereby forming a crosslinked network of polymer chains. Curing agents suitable for curing the partially polymerized furfuryl alcohol/aldehyde at temperatures above about 200° F. include, but are not limited to, organic and inorganic acid anhydrides, ammonium salts, sodium bisulfate, hydrolyzable esters such as butyl acetate, furfuryl acetate, organic acids such as maleic acid, fumaric acid, para-toluene sulfonic acid, inorganic acids such as phosphoric or sulfonic acid, and combinations thereof. In an embodiment, the curing agent comprises an organic acid; alternatively the curing agent comprises sodium bisulfate.

The resin system may also comprise a coupling agent, which is defined as a material having the ability to bond (i.e., adhere) the WSF comprising the resin system to solid surfaces, thereby sealing at least a portion of the wellbore and/or subterranean formation. Nonlimiting examples of suitable coupling agents include silanes having functional groups that give the silanes the ability to bond with a solid surface. Nonlimiting examples of such silanes include acrylate functionalized silanes, amine functionalized silanes, and vinyl functionalized silanes. In an embodiment, silane coupling agents suitable for use in the present disclosure comprise N-2-(aminoethyl)-3-aminopropyltrimethoxysilane, 3-glycidoxypropyltrimethoxysilane, N-beta-(aminoethyl)-gamma-aminopropyl trimethoxysilane, gamma-aminopropyltriethoxysilane, or combinations thereof. In an embodiment, the coupling agent comprises N-beta-(aminoethyl)-gamma-aminopropyl trimethoxysilane.

A liquid diluent may also be present in the resin system to increase the flexibility and reduce the brittleness of the cured thermoset polymer. Due to the presence of the diluent in the resin system, the degree of curing may be relatively reduced. A diluent suitable for use in this disclosure may decrease the viscosity of the resin system, ensuring that the resin system compositions can be pumped into a wellbore. Further, the diluent may reduce the brittleness of the resin system, meaning that it reduces the tendency of the compositions to crack or flake when bent, flexed, or scratched. The diluent may also act as a heat sink for the exothermic reaction that occurs as the non-polymerized resin in the resin system is cured. Nonlimiting examples of diluents suitable for use in this disclosure include, but are not limited to, alkyl acetates such as butyl acetate and furfuryl acetate, 2-butoxy ethanol, and combinations thereof. In an embodiment the diluent comprises, butyl acetate, alternatively furfuryl acetate.

The resin system can also comprise a ductility imparting agent. A ductility imparting agent is herein defined as a material having the ability to increase the ductility of the cured resin system (comprising a curable resin system), wherein ductility refers to the ability of a material to stretch under the application of tensile load and retain the deformed shape upon the removal of the load. Examples of suitable ductility imparting agents include, but are not limited to, phthalate materials, i.e., organic liquids that cause the curable resin to crosslink less tightly than normal. Nonlimiting examples of phthalate materials suitable for use in the present disclosure include alkyl phthalates such as diethyl phthalate, butyl benzyl phthalate, and di-(2-ethylhexyl) phthalate, or combinations thereof. In an embodiment, the ductility imparting agent comprises diethyl phthalate.

In an embodiment, the resin of the type disclosed herein may be present within the WSF in an amount of from about 5 wt. % to about 40 wt. %, alternatively from about 10 wt. % to about 30 wt. %, or alternatively from about 15 wt. % to about 25 wt. %, based on the total weight of the WSF; the curing agent may be present within the WSF in an amount of from about 1 wt. % to about 10 wt. %, alternatively from about 2 wt. % to about 8 wt. %, or alternatively from about 3 wt. % to about 5 wt. %, based on the weight of the resin; the coupling agent may be present within the WSF in an amount of from about 0.1 wt. % to about 5 wt. %, alternatively from about 1 wt. % to about 4 wt. %, or alternatively from about 2 wt. % to about 4 wt. %, based on the weight of the resin; the diluent may be present within the WSF in an amount of from about 0 wt. % to about 25 wt. %, alternatively from about 5 wt. % to about 20 wt. %, or alternatively about 10 wt. % to about 15 wt. %, based on the weight of the resin.

In an embodiment, the epoxy sealant comprises a two-component hardenable epoxy sealing composition, which may harden into a resilient solid impermeable mass. The two-component hardenable epoxy sealing composition may comprise a hardenable epoxide containing liquid and a hardening agent for the epoxide containing liquid. The hardenable epoxy sealing compositions may be compatible with water so that they can be displaced by or otherwise contacted with water without the occurrence of premature hardening or other adverse result.

In an embodiment, the hardenable epoxide containing liquid may comprise a hardenable epoxide and an optional solvent. The solvent may be added to the hardenable epoxide to reduce its viscosity for ease of handling, mixing and transferring. It will be apparent to one of skill in the art, and with the help of this disclosure, to determine if and how much solvent may be needed to achieve a viscosity suitable to the subterranean conditions. Factors that may affect this decision include geographic location of the well, the surrounding weather conditions, and the desired long-term stability of the sealant. An alternate way to reduce the viscosity of the hardenable epoxide is to heat it.

In an embodiment, the hardenable epoxide comprises organic resins such as bisphenol A diglycidyl ether resins, a diglycidyl ether of 1,4-butanediol, a diglycidyl ether of neopentylglycol, a diglycidyl ether of cyclohexane dimethanol, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, furan resins, urethane resins, glycidyl ether resins, other epoxide resins, and combinations thereof. In some embodiments, the hardenable epoxide may comprise an urethane resin. Examples of suitable urethane resins may comprise a polyisocyanate component and a polyhydroxy component.

The hardenable epoxide may be included in the hardenable epoxide containing liquid component in an amount in the range of from about 5 wt. % to about 100 wt. %, based on the weight of the hardenable epoxide containing liquid component. It will be apparent to one of skill in the art, and with the help of this disclosure, to determine how much of hardenable epoxide containing liquid component may be needed to achieve the desired results. Factors that may affect this decision include which type of hardenable epoxide containing liquid component and hardening agent component are used. In an embodiment, the hardenable epoxide containing liquid component may be included in the two-component hardenable epoxy sealing composition in an amount in the range of from about 50 wt. % to about 90 wt. %, based on the weight of the two-component hardenable epoxy sealing composition.

Any solvent that is compatible with the hardenable epoxide and achieves the desired viscosity effect may be suitable for use in the hardenable epoxide containing liquid component. Nonlimiting examples of solvents suitable for use in the present disclosure include methanol, isopropanol, butanol, butyl lactate, glycol ether solvents, dipropylene glycol methyl ether, dipropylene glycol dimethyl ether, diethyleneglycol methyl ether, ethyleneglycol butyl ether, diethyleneglycol butyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, hexoxyethanol, dimethyl formamide, propylene carbonate, D-limonene, fatty acid methyl esters, butylglycidyl ether, isomers thereof, and combinations thereof. Selection of an appropriate solvent is dependent on the hardenable epoxide composition chosen and is within the ability of one of skill in the art, with the help of this disclosure. In some embodiments, the amount of the solvent used in the liquid hardenable resin component may be in the range of from about 0.1 wt. % to about 30 wt. %, based on the weight of the hardenable epoxide containing liquid component.

In an embodiment, the hardening agent comprises cycloaliphatic amines, piperazine, aminoethylpiperazines; aromatic amines, methylene dianiline; 4,4'-diaminodiphenyl sulfone; aliphatic amines, ethylene diamine, diethylene triamine, triethylene tetraamine, tetraethylene pentaamine, N-cocoalkyltrimethylenediamine, isophoronediamine, diethyltoluenediamine and tris(dimethylaminomethylphenol); imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3,5-triazine; thiazole; pteridine; indazole; amines; polyamines; amides; polyamides; 2-ethyl-4-methyl imidazole; carboxylic acid anhydrides, methyltetrahydrophthalic anhydride, hexahydrophthalic anhydride, maleic anhydride, polyazelaic polyanhydride, phthalic anhydride; derivatives thereof, or combinations thereof. The chosen hardening agent often effects the range of temperatures over which a hardenable epoxide is able to cure. It will be apparent to one of skill in the art, and with the help of this disclosure, to determine which hardening agent should be used for a particular application. The hardening agent used may be included in the hardenable epoxide containing liquid component in an amount sufficient to at least partially harden the epoxy sealant. In an embodiment, the hardening agent may be present in the a two-component hardenable epoxy sealing composition in an amount in the range of from about 0.1 wt. % to about 95 wt. %, alternatively from about 15 wt. % to about 85 wt. %, or alternatively from about 15 wt. % to about 55 wt. %, based on the weight of the hardenable epoxide containing liquid component.

The two-component hardenable epoxy sealing composition may further comprise an optional coupling agent (e.g., a silane) of the type previously described herein. The optional coupling agent (e.g., a silane) may be used, among other things, to act as a mediator to help bond the epoxy sealant to at least a portion of the wellbore and/or subterranean formation. The optional coupling agents may be included in the two-component hardenable epoxy sealing composition in an amount in the range of from about 0.01 wt. % to about 5 wt. %, based on the weight of the two-component hardenable epoxy sealing composition.

In an embodiment, the epoxy sealant of the type disclosed herein may be present within the WSF in an amount of from about 40 wt. % to about 100 wt. %, alternatively from about 50 wt. % to about 95 wt. %, or alternatively from about 60 wt. % to about 95 wt. %, based on the total weight of the WSF.

In an embodiment, the WSF comprises helical fibers, which may help improve the mechanical properties (e.g., tensile strength, compressive strength, Young's modulus, Poisson's ratio, toughness, ductility, etc.) of a sealant composition (e.g., a hardened WSF of the type disclosed herein) when compared to the same sealant composition (e.g., a hardened WSF of the type disclosed herein) that does not contain helical fibers. In an embodiment, a helical fiber has the shape of a helix. A helix may be described mathematically as a curve in a three dimensional space. A helix may be generally characterized by a central axis, length, diameter and pitch. A helix may be either right handed or left handed, based on the turn of the helix (e.g., curve) around the central axis. For example, if the helix turns around the central axis in a clock wise direction, the helix is said to be right handed. Similarly, if the helix turns around the central axis in a counter clock wise direction, the helix is said to be left handed. The length of a helix may be measured along the central axis, between the two end points of the three dimensional curve defining the helix. The diameter of a helix may be measured in a plane perpendicular to the central axis of the helix, and it represents the largest dimension of the helix in such a plane. The pitch of a helix may be defined as the length of one complete helix turn, measured parallel to the central axis of the helix.

In an embodiment, the helical fibers suitable for use in the present disclosure comprises a right handed helix, a left handed helix, or combinations thereof.

In an embodiment, the helical fibers suitable for use in the present disclosure may have a length of from about 0.01 inches to about 1 inch, alternatively from about 0.1 inches to about 0.8 inches, or alternatively from about 0.2 inches to about 0.6 inches.

In an embodiment, the helical fibers suitable for use in the present disclosure may have a diameter of from about 0.001 inches to about 0.3 inches, alternatively from about 0.001 inches to about 0.05 inches, alternatively from about 0.01 inches to about 0.04 inches, or alternatively from about 0.01 inches to about 0.025 inches.

The helical fibers may be further characterized by an aspect ratio. The aspect ratio of a helical fiber may be calculated by dividing the length of the helical fiber by the diameter of the helical fiber. In an embodiment, the helical fiber suitable for use in the present disclosure may have an aspect ratio of from about 10 to about 100, alternatively from about 50 to about 90, alternatively from about 75 to about 100, or alternatively from about 10 to about 50.

In an embodiment, the helical fibers suitable for use in the present disclosure may have a pitch of from about 0.01 inches to about 0.25 inches, alternatively from 0.01 inches to about 0.1 inches, alternatively from about 0.1 inches to about 0.15 inches, or alternatively from 0.15 inches to about 0.25 inches. Alternatively, the helical fibers suitable for use in the present disclosure may be characterized as having from about 1 to about 50 pitches per inch of helix length, alternatively from about 1 to about 15 pitches per inch of helix length, alternatively from about 10 to about 20 pitches per inch of helix length, or alternatively from about 25 to about 50 pitches per inch of helix length, wherein the helix length is measured along the central axis of the helix.

In an embodiment, the helical fibers suitable for use in the present disclosure may be obtained by using any suitable methodology. In an embodiment, the helical fibers may be obtained by molding, extruding, forging, and the like, or combinations thereof. In another embodiment, the helical fibers may be obtained from any suitable fiber, by twisting, rotating, coiling, forging, inducing a circular motion to such fiber, and the like, or combinations thereof. For the purposes of the disclosure herein, such fiber will be referred to as a "helical fiber precursor (HFP)." The HFPs suitable for use in this disclosure may comprise fibers of any suitable geometry, including without limitation rods, fibers, crimped fibers, ribbons, and the like, or any combinations thereof. The HFPs suitable for use in this disclosure may comprise three dimensional features disposed along their length, such as grooves, indentations, protrusions, ridges, scales, hooks, hook barbs, and the like, or combinations thereof. The HFPs may be characterized by an outer diameter representing the largest dimension of any cross section though the HFPs. In an embodiment, the HFPs may have an outer diameter in the range of from about 0.01 inches to about 0.2 inches, alternatively from about 0.01 inches to about 0.1 inches, alternatively from about 0.1 inches to about 0.15 inches, or alternatively from about 0.15 inches to about 0.2 inches.

In an embodiment, the helical fibers may be made of any material that may help improve the mechanical properties (e.g., tensile strength, compressive strength, Young's modulus, Poisson's ratio, toughness, ductility, etc.) of a sealant composition (e.g., a hardened WSF of the type disclosed herein). In an embodiment, the helical fibers comprise metal fibers, aluminum fibers, metal alloy fibers, steel fibers, galvanized steel fibers, mineral fibers, ceramic fibers, stone wool fibers, glass fibers, glass fiber composites, thermoplastic fibers, plastic fibers, polypropylene fibers, polyethylene fibers, high-density polyethylene fibers, polyethylene terephthalate fibers, aramid (e.g., KEVLAR) fibers, Nylon 6,6 fibers, Rayon fibers, polyvinyl alcohol fibers, carbon fibers, carbon fiber composites, carbon nanofibers (e.g., carbon nanofiber bundles), resin fibers, epoxy-based fibers, resin/epoxy fibers, resin/epoxy composites, and the like, or combinations thereof.

In an embodiment, the helical fibers suitable for use in the present disclosure may have a specific density of from about 0.85 g/cc to about 10.0 g/cc, alternatively from about 2.0 g/cc to about 10 g/cc, or alternatively from about 4 g/cc to about 10 g/cc, as determined by pycnometry or any suitable similar methodology.

An example of commercially available helical fibers suitable for use in the present disclosure include, without being limited to, HELIX micro-rebar which are short, twisted and polygonal shaped wires available from Helix.

In an embodiment, the helical fibers may be included within the WSF in a suitable or effective amount (e.g., an amount effective to modify the mechanical properties of the hardened WSF). The resultant concentration and/or amount of helical fibers that is necessary to impart desired mechanical properties to a sealant composition (e.g., a hardened WSF) may be dependent upon a variety of factors such as the composition of the WSF; the type of sealant material used; the presence or absence of various additives; the intended wellbore location where the WSF is expected to harden and provide a seal for at least a portion of the wellbore and/or subterranean formation; the dimensions of the sealant compositions (e.g., hardened WSF); the temperature of the operational environment (e.g., the wellbore); the composition of the formation; the pressure of the formation; the diameter of the hole; the particular reinforcing material used (e.g., helical fibers alone or in combination with one or more conventional reinforcing materials); or combinations thereof. In an embodiment, helical fibers of the type disclosed herein may be present within the WSF in an amount of from about 0.1 vol. % to about 15 vol. %, alternatively from about 0.1 vol. % to about 10 vol. %, or alternatively from about 0.1 vol. % to about 7 vol. %, based on the total volume of the WSF.

In an embodiment, the WSF comprises a base fluid. In an embodiment, the base fluid is an aqueous-based fluid. In an embodiment, the base fluid is an oil-based fluid. In an embodiment, the base fluid comprises an emulsion or an invert emulsion.

In an embodiment, the base fluid comprises an aqueous-based fluid. Aqueous-based fluids that may be used in the WSF include any aqueous fluid suitable for use in subterranean applications, provided that the aqueous-based fluid is compatible with the sealant material and/or the helical fibers used in the WSF. For example, the aqueous-based fluid may comprise water or a brine. In an embodiment, the aqueous-based fluid comprises an aqueous brine. In such an embodiment, the aqueous brine generally comprises water and an inorganic monovalent salt, an inorganic multivalent salt, or both. The aqueous brine may be naturally occurring or artificially-created. Water present in the brine may be from any suitable source, examples of which include, but are not limited to, sea water, tap water, freshwater, water that is potable or non-potable, untreated water, partially treated water, treated water, produced water, city water, well-water, surface water, liquids comprising water-miscible organic compounds, and combinations thereof. The salt or salts in the water may be present in an amount ranging from greater than about 0% by weight to a saturated salt solution, alternatively from about 1 wt. % to about 30 wt. %, or alternatively from about 5 wt. % to about 10 wt. %, based on the weight of the salt solution. In an embodiment, the salt or salts in the water may be present within the base fluid in an amount sufficient to yield a saturated brine.

Nonlimiting examples of aqueous brines suitable for use in the present disclosure include chloride-based, bromide-based, phosphate-based or formate-based brines containing monovalent and/or polyvalent cations, salts of alkali and alkaline earth metals, or combinations thereof. Additional examples of suitable brines include, but are not limited to: NaCl, KCl, NaBr, $CaCl_2$, $CaBr_2$, $ZnBr_2$, ammonium chloride ($NH_4Cl$), potassium phosphate, sodium formate, potassium formate, cesium formate, ethyl formate, methyl formate, methyl chloro formate, triethyl orthoformate, trimethyl orthoformate, or combinations thereof. In an embodiment, the aqueous fluid comprises a brine.

In an embodiment, the base fluid comprises an oil-based fluid, such as for example an oleaginous fluid. Oleaginous fluids that may be used in the WSF include any oleaginous fluid suitable for use in subterranean applications, provided that the oleaginous fluid is compatible with the sealant material and/or the helical fibers used in the WSF. Examples of oleaginous fluids suitable for use in a WSF include, but are not limited to, petroleum oils, natural oils, synthetically-derived oils, oxygenated fluids, or combinations thereof. In an embodiment, the oleaginous fluid comprises diesel oil, kerosene oil, mineral oil, synthetic oils, aliphatic hydrocarbons, polyolefins (e.g., alpha olefins, linear alpha olefins and/or internal olefins), paraffins, silicone fluids, polydiorganosiloxanes, oxygenated solvents, esters, diesters of carbonic acid, alcohols, alcohol esters, ethers, ethylene glycol, ethylene glycol monoalkyl ether, ethylene glycol dialkyl ether, or combinations thereof, wherein the alkyl groups are methyl, ethyl, propyl, butyl, and the like.

In an embodiment, the base fluid comprises an emulsion. In such an embodiment, the emulsion is an oil-in-water emulsion comprising a non-oleaginous (e.g., an aqueous-based fluid of the type previously described herein) continuous phase and an oleaginous (e.g., an oil-based fluid of the type previously described herein) discontinuous phase.

In another embodiment, the base fluid comprises an invert emulsion. In such an embodiment, the invert emulsion is a water-in-oil emulsion comprising an oleaginous (e.g., an oil-based fluid of the type previously described herein) continuous phase and a non-oleaginous (e.g., an aqueous-based fluid of the type previously described herein) discontinuous phase.

The base fluid may be present within the WSF in an amount of from about 40 wt. % to about 90 wt. %, alternatively from about 45 wt. % to about 85 wt. %, or alternatively from about 50 wt. % to about 75 wt. %, based on the total weight of the WSF. Alternatively, the base fluid may comprise the balance of the WSF after considering the amount of the other components used.

The WSF may further comprise additional additives as deemed appropriate for improving the properties of the fluid. Such additives may vary depending on the intended use of the fluid in the wellbore. Examples of such additives include, but are not limited to suspending agents, density reducing additives, settling prevention agents, expansion additives, clays, salts, accelerants, set retarders, lignosulfonates, defoamers, surfactants, dispersing agents, fluid loss control agents, weighting materials, dispersants, fillers, zeolites, barite, calcium sulfate, silica flour, sand, slag, vitrified shale, fly ash, pozzolanic ash, lime, formation conditioning agents, fluid absorbing materials, resins, aqueous superabsorbers, viscosifying agents, gelling agents, crosslinkers, mechanical property modifying additives, elastomers, styrene-butadiene copolymers, conventional reinforcing materials, carbon fibers, glass fibers, metal fibers, minerals fibers, or combinations thereof. These additives may be introduced singularly or in combination using any suitable methodology and in amounts effective to produce the desired improvements in the properties of the WSF before and after hardening of the WSF. As will appreciated by one of skill in the art with the help of this disclosure, any of the components and/or additives used in the WSF have to be compatible with the sealant material and/or the helical fibers used in the WSF composition.

In an embodiment, the WSF comprises a suspending agent. A suspending agent may function to prevent solid particles (e.g., helical fibers) present in the composition from settling. Nonlimiting examples of suspending agents suitable for use in the present disclosure include clays, water swellable clays, bentonite, montmorillonite, silica fume, or combinations thereof. A commercial example of a suspending agent includes, but is not limited to, SILICALITE cement additive which is a cement additive made from a finely divided, high surface-area silica, and is available from Halliburton Energy Services, Inc.

In an embodiment, the WSF comprises a density reducing additive. Nonlimiting examples of density reducing additives suitable for use in the present disclosure include elastomeric beads, thermoplastic beads, hollow beads, cenospheres, hollow glass beads, hollow ceramic beads, hollow resin beads, spherelite, perlite, zeolite, pumice, or combinations thereof.

Nonlimiting examples of commercially available density reducing additives suitable for use in the present disclosure include SPHERELITE cement additive; SCOTCHLITE glass bubbles; and EXPANCEL microspheres. SPHERELITE cement additive is hollow, fused, pressure-resistant mineral spheres, and is available from Halliburton Energy Services, Inc. SCOTCHLITE glass bubbles is a filler available from 3M. EXPANCEL microspheres is a multi-performance additive available from Akzo Nobel.

As will be apparent to one of skill in the art, with the help of this disclosure, other suitable additives/components may be used in the WSF, and each additive/component of the WSF may perform more than one function (e.g., a helical fiber may be a reinforcing material as well as a weighting agent).

As will be apparent to one of skill in the art, with the help of this disclosure, the WSF may comprise a plurality of types of helical fibers. In an embodiment, the WSF comprises a first type of helical fibers, a second type of helical fibers, a third type of helical fibers, etc. In an embodiment, the first type of helical fibers comprises one or more distinctive parameters such as a first aspect ratio, a first length, a first pitch, a first diameter, etc. In an embodiment, the second type of helical fibers comprises one or more distinctive parameters such as a second aspect ratio, a second length, a second pitch, a second diameter, etc. For example, in an embodiment, the WSF may comprise a first type of helical fibers with an aspect ratio of about 25, a second type of helical fibers with an aspect ratio of about 50, and optionally one or more conventional reinforcing materials. For example, in an embodiment, the WSF may comprise a first type of helical fibers with a length of about 0.25 inches, a second type of helical fibers with a length of about 0.5 inches, and optionally one or more conventional reinforcing materials. As will be apparent to one of skill in the art, with the help of this disclosure, each type of helical fiber may have one or more distinctive parameters (e.g., aspect ratio, length, pitch, diameter, etc.) that may be the same or different with one or more distinctive parameters (e.g., aspect ratio, length, pitch, diameter, etc.) of another type of helical fiber. For example, in an embodiment, the WSF may comprise a first type of helical fibers with an aspect ratio of 25 and a length of about 0.25 inches, a second type of helical fibers with an aspect ratio of 25 and a length of about 0.5 inches, and optionally one or more conventional reinforcing materials. For example, in an embodiment, the WSF may comprise a first type of helical fibers with an aspect ratio of 25 and a length of about 0.5 inches, a second type of helical fibers with an aspect ratio of 50 and a length of about 0.5 inches, and optionally one or more conventional reinforcing materials.

In an embodiment, the WSF comprises a sealant material, helical fibers, a suspending agent, and a base fluid. For example, the WSF may comprise 70 wt. % class G Portland cement, and 0.2 wt. % of a suspending agent (e.g., bentonite), based on the total weight of the WSF. The WSF also comprises 0.5 vol. % HELIX micro-rebar, based on the total volume of the WSF. The WSF may comprise a KCl brine as the base fluid.

In an alternative embodiment, the WSF comprises a sealant material, helical fibers, a fluid loss control agent, and a base fluid. For example, the WSF may comprise 70 wt. % class H Portland cement, and 1 wt. % of LATEX 2000 cement additive, based on the total weight of the WSF. The WSF also comprises 0.5 vol. % HELIX micro-rebar, based on the total volume of the WSF. The WSF may comprise a KCl brine as the base fluid.

In another embodiment, the WSF comprises a sealant material, helical fibers, and a base fluid. For example, the WSF may comprise 90 wt. % resin sealant (e.g., an urea-formaldehyde resin), based on the total weight of the WSF, and 0.5 vol. % HELIX micro-rebar, based on the total volume of the WSF. The WSF may comprise water as the base fluid.

In yet another embodiment, the WSF comprises a sealant material, helical fibers, and a base fluid. For example, the WSF may comprise 90 wt. % epoxy sealant (e.g., a bisphenol A diglycidyl ether resin), based on the total weight of the WSF, and 0.5 vol. % HELIX micro-rebar, based on the total volume of the WSF. The WSF may comprise water as the base fluid.

In still yet another embodiment, the WSF comprises a sealant material, helical fibers, and a base fluid. For example, the WSF may comprise 80 wt. % latex sealant (e.g., a styrene/butadiene copolymer emulsion), based on the total weight of the WSF, and 0.5 vol. % HELIX micro-rebar, based on the total volume of the WSF. The WSF may comprise water as the base fluid.

In an embodiment, the WSF comprising helical fibers may be prepared using any suitable method or process. The components of the WSF (e.g., a sealant material, helical fibers, a base fluid, suspending agents, density reducing additives, etc.) may be combined and mixed in by using any mixing device compatible with the composition, e.g., a mixer, a batch mixer, a batch mixer with impellers and/or paddles, a blender, a batch blender, single ribbon type blenders, double ribbon type blenders, horizontal blenders, vertical blenders, inclined blenders, single or double ribbon type blenders which could further be horizontal, vertical or inclined, mixing eductors, dry powder eductors, dry powder eductor with centrifugal pump followed by circulation loop, cyclone-type dry to liquid mixer, inline static mixers, and the like, or any suitable combination thereof.

Helical fibers of the type disclosed herein may be included in any suitable wellbore servicing fluid (WSF). As used herein, a "servicing fluid" or "treatment fluid" refers generally to any fluid that may be used in a subterranean application in conjunction with a desired function and/or for a desired purpose, including but not limited to fluids used to drill, complete, work over, fracture, repair, or in any way prepare a wellbore for the recovery of materials residing in a subterranean formation penetrated by the wellbore. Examples of wellbore servicing fluids include, but are not limited to, cement slurries, drilling fluids or muds, spacer fluids, lost circulation fluids, fracturing fluids, gravel packing fluids, diverting fluids or completion fluids. The servicing fluid is for use in a wellbore that penetrates a subterranean formation. It is to be understood that "subterranean formation" encompasses both areas below exposed earth and areas below earth covered by water such as ocean or fresh water.

In an embodiment, the components of the WSF are combined at the well site. In an embodiment, additional reinforcing materials (e.g., conventional reinforcing materials) may be added to the WSF on-the-fly (e.g., in real time or on-location) along with the other components/additives. The resulting WSF may be pumped downhole where it may harden and function as intended (e.g., seal at least a portion of the wellbore and/or subterranean formation).

As it will be appreciated by one of ordinary skill in the art and with the help of this disclosure, a WSF comprising a sealant material and helical fibers of the type disclosed herein may be used for sealing at least a portion of the wellbore and/or subterranean formation in any suitable stage of a wellbore's life, such as for example, during a drilling operation, completion operation, production stage, etc.

Servicing a wellbore includes, without limitation, positioning the WSF comprising a sealant material and helical fibers of the type disclosed herein in the wellbore to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; a temporary plug to divert treatment fluids; and to seal an annulus between the wellbore and an expandable pipe or pipe string. For instance, the WSF comprising a sealant material and helical fibers of the type disclosed herein may set in a loss-circulation zone and thereby restore circulation. The set composition plugs the zone and inhibits loss of subsequently pumped drilling fluid, which allows for further drilling.

In an embodiment, when desired (for example, upon the cessation of drilling operations and/or upon reaching a desired depth), the wellbore or a portion thereof may be prepared for completion. In an embodiment, the method of using a WSF comprising a sealant material and helical fibers of the type disclosed herein may comprise completing the wellbore. In an embodiment, the WSF comprising a sealant material and helical fibers of the type disclosed herein may be employed in well completion operations such as primary and secondary cementing operations. The wellbore, or a portion thereof, may be completed by providing a casing string within the wellbore and cementing or otherwise securing the casing string within the wellbore. In such an embodiment, the casing string may be positioned (e.g., lowered into) the wellbore to a desired depth prior to, concurrent with, or following provision of the WSF comprising a sealant material and helical fibers of the type disclosed herein by pumping such a WSF downward through an interior flowbore of the casing string and into an annular space formed by the casing string and the wellbore walls. When the WSF comprising a sealant material and helical fibers of the type disclosed herein has been positioned, the WSF may be allowed to harden or set. The hardened WSF comprising a sealant material and helical fibers of the type disclosed herein may thus form a barrier that prevents fluids in that subterranean formation from migrating into a different portion of the wellbore. Within the annulus, the WSF also serves to support a conduit, e.g., casing, in the wellbore.

In an embodiment, the wellbore in which the WSF comprising a sealant material and helical fibers of the type disclosed herein is positioned belongs to a multilateral wellbore configuration. It is to be understood that a multilateral wellbore configuration includes at least two principal wellbores connected by one or more ancillary wellbores. In secondary cementing, often referred to as squeeze cementing, the WSF comprising a sealant material and helical fibers of the type disclosed herein may be strategically positioned in the wellbore to plug a void or crack in the conduit, to plug a void or crack in a hardened cement sheath residing in the annulus, to plug a relatively small opening known as a microannulus between the hardened sealant and the conduit, and so forth, thus acting as a sealant composition.

In an embodiment, the WSF comprising helical fibers of the type disclosed herein and methods of using the same disclosed herein may be advantageously employed as a servicing fluid in the performance of one or more wellbore servicing operations. For example, when utilizing a WSF comprising a sealant material and helical fibers of the type disclosed herein, the mechanical properties (e.g., tensile strength, compressive strength, Young's modulus, Poisson's ratio, toughness, etc.) of the hardened WSF may be advantageously improved when compared to the mechanical properties of a similar hardened WSF that does not contain helical fibers of the type disclosed herein.

In an embodiment, the hardened WSF comprising a sealant material and helical fibers of the type disclosed herein may be advantageously characterized by a tensile strength of from about 25 pounds per square inch (psi) to about 2000 psi, alternatively from about 25 psi to about 200 psi, alternatively from about 200 psi to about 500 psi, or alternatively from about 500 psi to about 2000 psi. The tensile strength of a material can be defined as the maximum longitudinal stress (e.g., tensile stress) a material can withstand before tearing or breaking. The tensile strength may be determined experimentally through laboratory testing, such as for example the Brazilian Tensile Test (BTT) and/or the Dog Bone Tensile Test (DBTT). BTT and DBTT may produce other information in addition to tensile strength, such as for example compressive strength, toughness, Young's modulus, and Poisson's ratio.

In an embodiment, the helical shape of the reinforcing material (e.g., helical fibers) of the WSF of the type disclosed herein may advantageously allow for a higher friction force for pulling out the helical fibers out of the hardened WSF matrix, and consequently lead to a better mechanical reinforcement of the hardened WSF and a higher tensile strength of the hardened WSF, when compared to a similar hardened WSF that does not contain helical fibers of the type disclosed herein.

In an embodiment, the hardened WSF comprising a sealant material and helical fibers of the type disclosed herein may advantageously exhibit an increase in tensile strength of from about 5% to about 35%, alternatively from about 10% to about 30%, or alternatively from about 15% to about 30%, when compared to a similar hardened WSF that does not contain helical fibers of the type disclosed herein.

In an embodiment, the hardened WSF comprising a sealant material and helical fibers of the type disclosed herein may be advantageously characterized by a compressive strength of from about 25 psi to about 15000 psi, alternatively from about 25 psi to about 500 psi, alternatively from about 500 psi to about 5000 psi, or alternatively from about 5000 psi to about 15000 psi. The compressive strength of a material can be defined as the maximum capacity of a material or structure to withstand axially directed pushing forces before the structural integrity of the material is compromised (e.g., falling apart, crumbling, etc.).

In an embodiment, the hardened WSF comprising a sealant material and helical fibers of the type disclosed herein may be advantageously characterized by a tensile strength to compressive strength ratio of from about 0.01 to about 0.5, alternatively from about 0.01 to about 0.1, alternatively from about 0.1 to about 0.2, or alternatively from about 0.2 to about 0.5. In an embodiment, the hardened WSF comprising a sealant material and helical fibers of the type disclosed herein may advantageously exhibit an increase in tensile strength to compressive strength ratio of from about 5% to about 75%, alternatively from about 5% to about 15%, alternatively from about 15% to about 20%, or alternatively from about 20% to about 75%, when compared to the tensile strength to compressive strength ratio of a similar hardened WSF that does not contain helical fibers of the type disclosed herein.

In an embodiment, the hardened WSF comprising a sealant material and helical fibers of the type disclosed herein may be advantageously characterized by a Young's modulus of from about 0.1 million psi to about 4 million psi, alternatively from about 0.1 million psi to about 0.8 million psi, alternatively from about 0.8 million psi to about 2 million psi, or alternatively from about 2 million psi to about 4 million psi. Young's modulus, which is also known as the tensile modulus or the elastic modulus, is a measure of the stiffness of a material, and is generally defined as the ratio of the stress along an axis over the strain along that axis in the range of stress in which Hooke's law applies.

In an embodiment, the hardened WSF comprising a sealant material and helical fibers of the type disclosed herein may advantageously be more ductile (e.g., may exhibit increased strain values at which compressive failure occurs) when compared to a similar hardened WSF that does not contain helical fibers of the type disclosed herein. The higher strain values may result in lower Young's modulus values.

In an embodiment, the hardened WSF comprising a sealant material and helical fibers of the type disclosed herein may advantageously exhibit a decrease in Young's modulus of from about 5% to about 75%, alternatively from about 5% to about 15%, alternatively from about 15% to about 25%, or alternatively from about 25% to about 75%, when compared to a similar hardened WSF that does not contain helical fibers of the type disclosed herein.

In an embodiment, the hardened WSF comprising a sealant material and helical fibers of the type disclosed herein may be advantageously characterized by a Poisson's ratio of from about 0.1 to about 0.4, alternatively from about 0.1 to about 0.2, alternatively from about 0.2 to about 0.3, or alternatively from about 0.3 to about 0.4. Poisson's ratio is a measure of the stiffness of a material, and is generally defined as the negative ratio of transverse to axial strain.

In an embodiment, the hardened WSF comprising a sealant material and helical fibers of the type disclosed herein may advantageously exhibit an increase in Poisson's ratio of from about 0.5% to about 80%, alternatively from about 0.5% to about 20%, alternatively from about 20% to about 50%, or alternatively from about 50% to about 80%, when compared to a similar hardened WSF that does not contain helical fibers of the type disclosed herein.

In an embodiment, the hardened WSF comprising a sealant material and helical fibers of the type disclosed herein may be advantageously characterized by a toughness of from about 0.1 inch-pound-force per cubic inch (in·lbf/in$^3$) to about 100 in·lbf/in$^3$, alternatively from about 0.1 in·lbf/in$^3$ to about 10 in·lbf/in$^3$, alternatively from about 10 in·lbf/in$^3$ to about 40 in·lbf/in$^3$, or alternatively from about 40 in·lbf/in$^3$ to about 100 in·lbf/in$^3$. The toughness, also known as the modulus of toughness, of a material is a measure of the total amount of energy exerted into a sample until complete failure of the sample. Further, the toughness can be calculated as the area under the tensile strength curve plotted against the strain.

In an embodiment, the hardened WSF comprising a sealant material and helical fibers of the type disclosed herein may advantageously exhibit an increase in toughness of from about 0.5% to about 200%, alternatively from about 0.5% to about 20%, alternatively from about 20% to about 100%, or alternatively from about 100% to about 200%, when compared to a similar hardened WSF that does not contain helical fibers of the type disclosed herein.

In an embodiment, the improved mechanical properties (e.g., tensile strength, compressive strength, Young's modulus, Poisson's ratio, toughness, etc.) of the hardened WSF may advantageously decrease the need for remedial work to repair fractured hardened WSFs. In an embodiment, the use of a WSF comprising a sealant material and helical fibers of the type disclosed herein may advantageously allow for post-fracture bridging of the newly created surfaces, thus maintaining the overall integrity of the original hardened WSF matrix, even when a shear force is applied to the fractured matrix.

In an embodiment, the WSF comprising a sealant material and helical fibers of the type disclosed herein may be advantageously used in wellbores having bottom hole temperatures (BHTs) in the range of from about 32° F. to about 650° F., alternatively from about 32° F. to about 500° F., alternatively from about 32° F. to about 180° F., alternatively from about 180° F. to about 300° F., or alternatively from about 300° F. to about 500° F. In an embodiment, the WSF comprising a sealant material and helical fibers of the type disclosed herein may be advantageously used in a geothermal wellbore, e.g., a wellbore with a BHT in the range of from about 400° F. to about 650° F. Additional advantages of the WSF system and/or the methods of using the same may be apparent to one of skill in the art viewing this disclosure.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

The mechanical properties of samples comprising a cementitious material were investigated. More specifically, the tensile strength of cement samples was investigated in the presence and in the absence of helical fibers within the cement composition. For all the results presented, the helical fibers were HELIX micro-rebar of three different lengths. HELIX micro-rebar with a length of 1 inch are termed "long fibers" for the purposes of the disclosure herein. Long fibers have an aspect ratio of 50. HELIX micro-rebar with a length of ½ inch are termed "short fibers" for the purposes of the disclosure herein. Short fibers have an aspect ratio of 25. HELIX micro-rebar with a length of ¼ inch are termed "ultra-short fibers" for the purposes of the disclosure herein. Ultra-short fibers have an aspect ratio of 12.5. All cement samples were made with DYCKERHOFF CLASS G cement available from Halliburton Energy Services, Inc, by preparing a cementitious slurry with a density of about 17 pounds per gallon (ppg), unless otherwise noted. All cement samples contained 0.25% by weight of cement (bwoc) VERSASET thixotropic additive available from Halliburton Energy Services, Inc. Unless otherwise noted, when used, the concentration of the HELIX micro-rebar in the cementitious slurry was 0.5 vol. %, based on the volume of the cementitious slurry. DBTT and BTT were employed for studying the tensile strength of the cement samples.

For the BTT, the helical fibers were mixed in the cement composition, and the samples were poured into cylindrical shapes with a diameter of 2 inches and a height of 4 inches. The cylinder was then cut into 4 equal samples of approximately 1 inch in length. The BTT was conducted using an MTS 311 class hydraulic load frame which collects time, displacement, and axial load data sets. BTT was carried out by a method similar to the standards put forth in ASTM D3967-08. The samples were placed on the load frame with the flat edges of the sample facing horizontally to the platens of the instrument. An axial force was then applied in compression until the sample failed, e.g., lost structural integrity, crumbled, etc.

For the DBTT, the helical fibers were mixed in the cement composition, and the samples were poured into a dogbone mold with the middlemost section having a squared geometry of 1 inch by 1 inch. Sometimes, 3-4 fibers were placed in the cement sample such that the primarily longitudinal axis of the helical fibers would be parallel to the direction of the force applied to pull apart the sample. The DBTT was tested using a Tinius Olsen hydraulic load frame which collects time, displacement, and axial load data sets. The samples were placed in the load frame with the "grabbers" and an axial force is applied in tension until the sample failed, e.g., the sample was pulled apart.

Figure 1A:
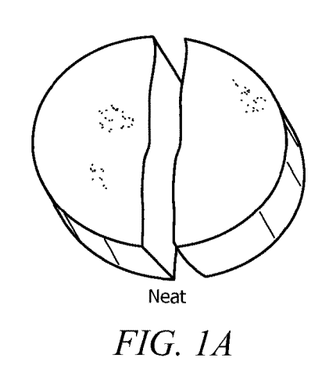
FIGS. 1A-1F display the results of tensile strength testing on neat cement samples and on cement samples comprising helical fibers.
Figure 1B:
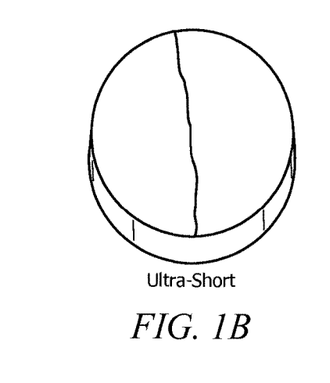
Figure 1C:
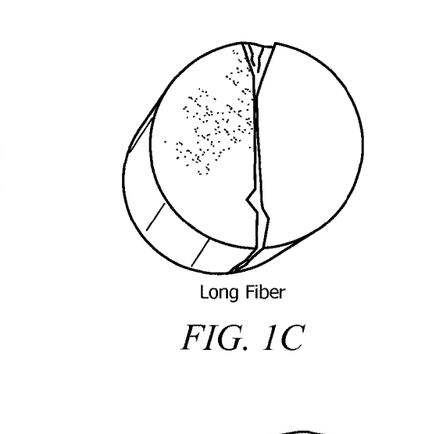
Figure 1D:
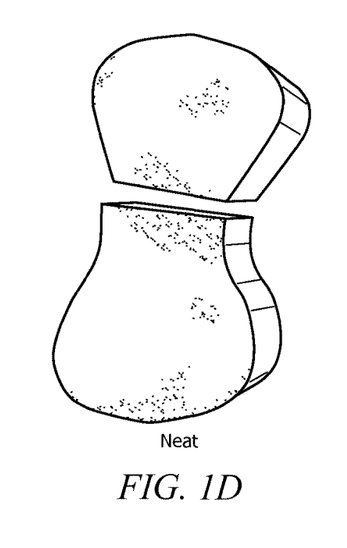
Figure 1E:
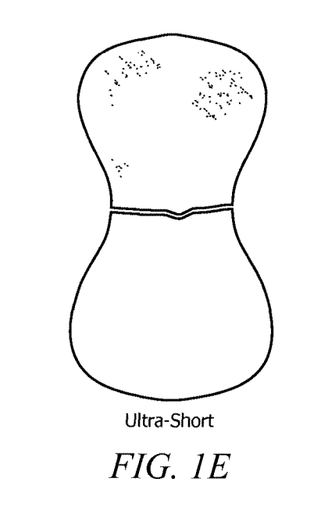
Figure 1F:
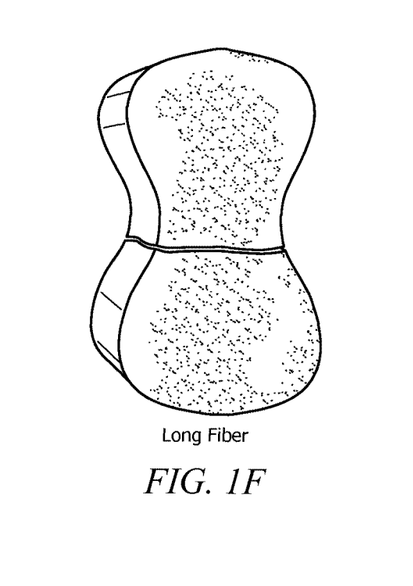

Representative results for the BTT testing are displayed in FIGS. 1a, 1b and 1c, and for the DBTT testing are displayed in FIGS. 1d, 1e, and 1f. BTT and DBTT we conducted for neat cement samples, cement samples containing ultra-short fibers, and cement samples containing long fibers. In both tests, the visual examination of the samples indicated that for the neat samples (i.e., samples containing no helical fibers) the fractured parts of the cement samples completely separated from each other. By contrast, for the samples containing helical fibers, whether ultra-short fibers or long fibers, the fractured parts of the cement samples did not completely separate from each other, but were held together by the helical fibers used. The numerical results for the tensile strength obtained from the DBTT and BTT are summarized in Table 1.

TABLE 1

| Type of Sample | BTT Tensile Strength [psi] | DBTT Tensile Strength [psi] |
|---|---|---|
| Neat Cement | 346 | 268 |
| Cement with Ultra-Short Fibers | 391 | 285 |
| Cement with Long Fibers | 418 | 320 |

The data displayed in Table 1 indicates that regardless of the type of testing used, the tensile strength increased for the samples containing helical fibers when compared to the neat cement samples. Also, the tensile strength was higher for the samples containing long fibers, when compared to the samples containing ultra-short fibers.

Example 2

The mechanical properties of samples comprising a cementitious material were investigated. More specifically, the tensile strength of cement samples was investigated in the presence and in the absence of helical fibers within the cement composition. The samples were tested by BTT, as described in Example 1. Three different types of samples were tested, as follows: neat cement samples (with the data displayed Table 2), cement samples containing 0.2 vol. % long fibers (with the data displayed Table 3), and samples containing 0.5 vol. % long fibers (with the data displayed Table 4).

TABLE 2

| Sample # | Tensile Strength [psi] | Cementitious Slurry Density [ppg] |
|---|---|---|
| 1 | 378 | 16.12 |
| 2 | 455 | 16.29 |
| 3 | 359 | 16.45 |
| 4 | 314 | 16.62 |
| 5 | 302 | 16.18 |
| 6 | 346 | 16.40 |
| 7 | 353 | 16.54 |
| 8 | 282 | 16.68 |

TABLE 3

| Sample # | Tensile Strength [psi] | Cementitious Slurry Density [ppg] |
|---|---|---|
| 9 | 421 | 16.26 |
| 10 | 301 | 16.52 |
| 11 | 399 | 16.45 |
| 12 | 288 | 16.72 |
| 13 | 329 | 16.19 |
| 14 | 347 | 16.51 |
| 15 | 332 | 16.62 |
| 16 | 294 | 16.75 |

TABLE 4

| Sample # | Tensile Strength [psi] | Cementitious Slurry Density [ppg] |
|---|---|---|
| 17 | 385 | 17.03 |
| 18 | 377 | 16.74 |
| 19 | 445 | 16.68 |
| 20 | 336 | 16.56 |
| 21 | 528 | 16.66 |
| 22 | 764 | 16.79 |
| 23 | 430 | 16.87 |
| 24 | 307 | 16.96 |

The average tensile strength was 348.6 psi for the neat cement samples (Table 2); 338.9 psi for the cement samples containing 0.2 vol. % long fibers; and 446.5 psi for the cement samples containing 0.5 vol. % long fibers. The cement samples containing 0.2 vol. % long fibers underperformed (i.e., displayed an overall decrease in tensile strength), probably due to the fact that there were little to no fibers in most samples, as settling of fibers was noticed by visual inspection. The cement samples containing 0.5 vol. % long fibers displayed an increase in tensile strength of 28.1%, when compared to the neat samples.

Example 3

The mechanical properties of samples comprising a cementitious material were investigated. More specifically, the tensile strength of cement samples was investigated in the presence and in the absence of helical fibers within the cement composition. The samples were tested by BTT, as described in Example 1. Three different types of samples were tested, as follows: neat cement samples (with the data displayed Table 5), cement samples containing 0.5 vol. % short fibers (with the data displayed Table 6), and samples containing 0.5 vol. % long fibers (with the data displayed Table 7).

TABLE 5

| Sample # | Tensile Strength [psi] | Cementitious Slurry Density [ppg] |
|---|---|---|
| 25 | 302 | 18.26 |
| 26 | 395 | 18.26 |
| 27 | 312 | 18.27 |
| 28 | 372 | 18.31 |
| 28 | 301 | 18.16 |
| 30 | 310 | 18.22 |
| 31 | 435 | 18.18 |
| 32 | 348 | 18.26 |
| 33 | 290 | 18.20 |
| 34 | 339 | 18.17 |
| 35 | 393 | 18.21 |
| 36 | 312 | 18.33 |
| 37 | 472 | 18.30 |
| 38 | 329 | 18.26 |
| 39 | 343 | 18.23 |
| 40 | 280 | 18.24 |

TABLE 6

| Sample # | Tensile Strength [psi] | Cementitious Slurry Density [ppg] |
|---|---|---|
| 41 | 478 | 18.36 |
| 42 | 480 | 18.33 |
| 43 | 516 | 18.28 |
| 44 | 376 | 18.32 |
| 45 | 255 | 18.32 |
| 46 | 327 | 18.31 |
| 47 | 442 | 18.36 |
| 48 | 321 | 18.41 |
| 49 | 311 | 18.19 |
| 50 | 397 | 18.16 |
| 51 | 420 | 18.38 |
| 52 | 402 | 18.48 |
| 53 | 329 | 18.34 |
| 54 | 357 | 18.40 |
| 55 | 386 | 18.41 |
| 56 | 452 | 18.46 |

TABLE 7

| Sample # | Tensile Strength [psi] | Cementitious Slurry Density [ppg] |
|---|---|---|
| 57 | 446 | 18.22 |
| 58 | 536 | 18.35 |
| 59 | 420 | 18.12 |
| 60 | 306 | 18.41 |
| 61 | 280 | 18.20 |
| 62 | 411 | 18.27 |
| 63 | 548 | 18.24 |
| 64 | 414 | 18.32 |
| 65 | 744 | 18.31 |
| 66 | 294 | 18.33 |
| 67 | 411 | 18.08 |
| 68 | 305 | 18.41 |
| 69 | 350 | 18.16 |
| 70 | 369 | 18.23 |
| 71 | 417 | 18.32 |
| 72 | 436 | 18.55 |

The average tensile strength was 345.81 psi for the neat cement samples (Table 5); 390.56 psi for the cement samples containing 0.5 vol. % short fibers; and 417.94 psi for the cement samples containing 0.5 vol. % long fibers. Both cement samples containing helical fibers showed an increase in tensile strength, whether they contained short fibers or long fibers. The cement samples containing 0.5 vol. % short fibers displayed an increase in tensile strength of 12.9%, when compared to the neat samples. The cement samples containing 0.5 vol. % long fibers displayed an increase in tensile strength of 20.8%, when compared to the neat samples.

Figure 2:
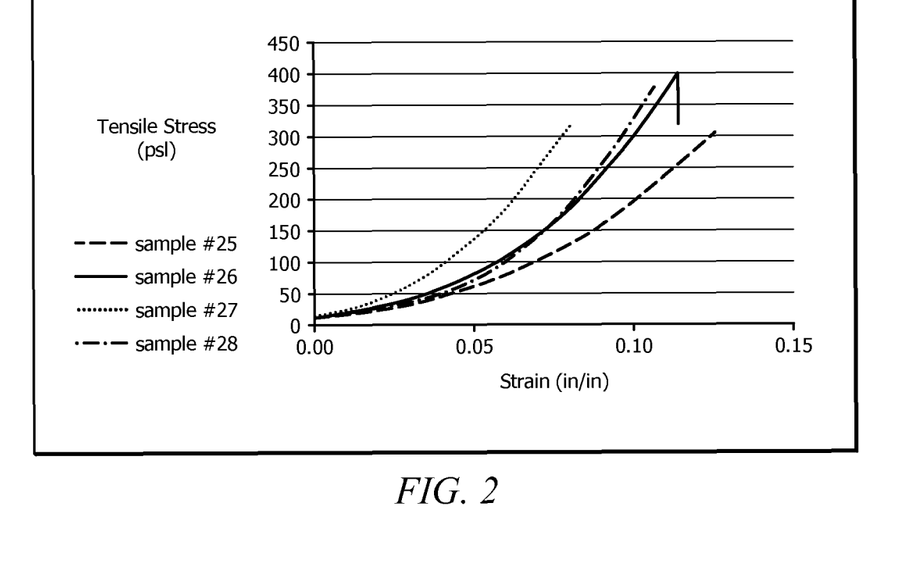
FIG. 2 displays the results of tensile stress testing on neat cement samples.
Figure 3:
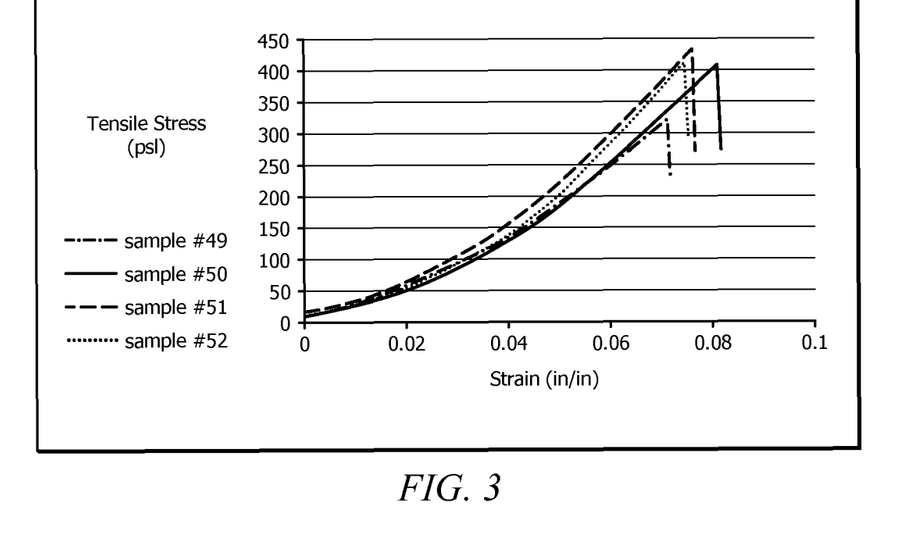
FIGS. 3 and 4 display the results of tensile stress testing on cement samples comprising helical fibers.
Figure 4:
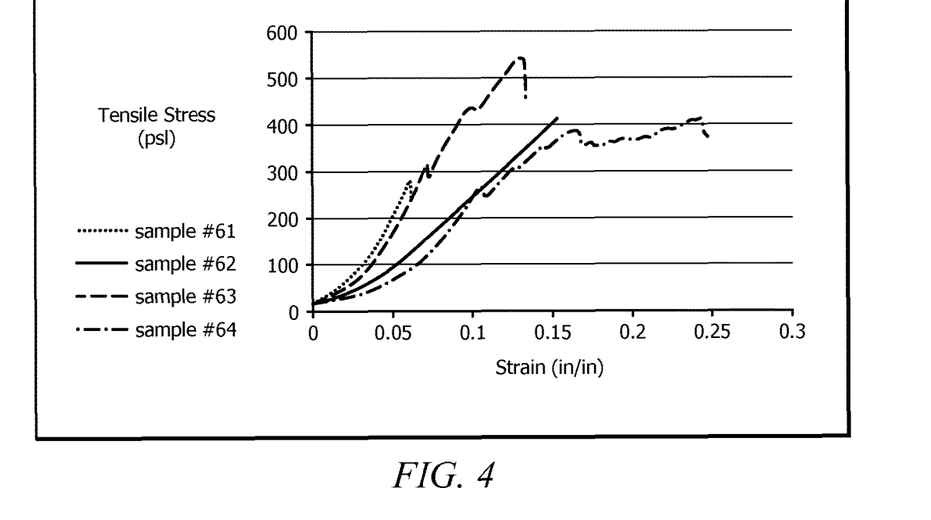

From the data presented in Table 5, the tensile stress curves are shown in FIG. 2 for four of the neat cement samples. From the data presented in Table 6, the tensile stress curves are shown in FIG. 3 for four of the cement samples containing 0.5 vol. % short fibers. From the data presented in Table 7, the tensile stress curves are shown in FIG. 4 for four of the cement samples containing 0.5 vol. % long fibers. The samples for which the tensile strength data is shown in FIGS. 2, 3 and 4 were used for calculating the toughness of the samples.

Figure 5:
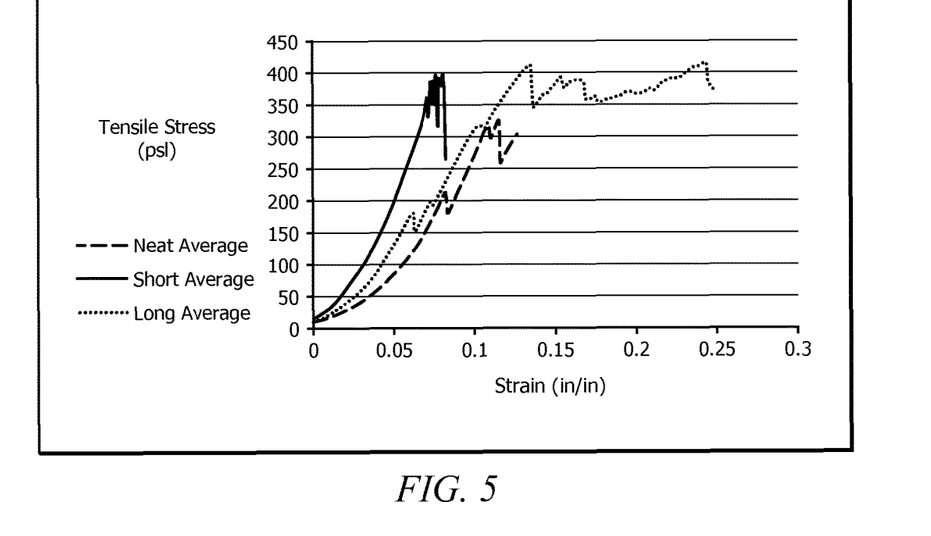
FIG. 5 displays the results of tensile stress testing on neat cement samples and cement samples comprising helical fibers.

FIG. 2 displays typical data for neat cement samples which, upon failure, break apart and the tensile stress drops to 0. For the samples containing helical fibers, after failure has occurred, the helical fibers then have to be physically pulled out of the cement matrix for complete failure of the system. Additional energy is required to pull the helical fibers out of the cement and the increased amount of energy translates into a higher area under the tensile stress curve (i.e., increased toughness). The addition of helical fibers should help bridge off a fracture preventing the sample from breaking apart at initial failure. The expectation is that the toughness should increase with the addition of the helical fibers. FIG. 4 indicates that the long fibers require a greater amount of energy until complete failure has occurred. The curves in each of the FIGS. 2, 3 and 4 were averaged, and the data is displayed in FIG. 5, supporting that the long fibers require a greater amount of energy to be expanded until complete failure has occurred.

A summary of the individual test results for tensile strength and toughness for the different samples corresponding to FIGS. 2, 3 and 4 is shown in Table 8, and the averages are displayed in Table 9.

TABLE 8

| | Neat | | Short Fiber | | Long Fiber | |
| --- | --- | --- | --- | --- | --- | --- |
| | Tensile Strength psi | Toughness in · lbf/in$^3$ | Tensile Strength psi | Toughness in · lbf/in$^3$ | Tensile Strength psi | Toughness in · lbf/in$^3$ |
| | 302 | 14.1 | 311 | 9.8 | 280 | 7.2 |
| | 395 | 15.8 | 397 | 13.2 | 411 | 27.9 |
| | 312 | 9.6 | 420 | 13.4 | 548 | 35.3 |
| | 372 | 12.9 | 402 | 11.9 | 415 | 60.7 |
| AVERAGE | 346 | 13.1 | 382 | 12.1 | 413 | 32.8 |

TABLE 9

| Sample Type | Tensile Strength psi | Tensile Strength Increase | Toughness in · lbf/in$^3$ | Toughness Increase |
| --- | --- | --- | --- | --- |
| Neat | 346 | | 13.1 | |
| Short Fiber | 382 | 10.7% | 12.1 | −8.0% |
| Long Fiber | 413 | 16.4% | 32.8 | 150.2% |

The aspect ratio plays an important role in the performance of the helical fibers. When using short fibers with an aspect ratio of 25, there is a lower chance that a fiber will bridge off a crack and maintain post fracture integrity, which is illustrated by the lower magnitude of the increase in tensile strength for the short fibers, when compared to the increase in tensile strength for the long fibers that have an aspect ratio of 50. The negative percent increase in toughness for the short fibers from Table 9 is most likely a result of decreasing the aspect ratio. If the diameter were to decrease as the length decreased, a larger percentage of fibers could be added in the slurry increasing the chance that several fibers will bridge a crack from several angles. It would also be expected that if the aspect ratio of the fibers were to stay the same, the performance of the fibers should remain somewhat similar.

The long fibers exhibited a 16.4% increase in tensile strength and a 150% increase in toughness, when compared with the neat cement samples. This significant increase in toughness could be due to the fact that the fibers must be pulled out of the cement sample after initial failure of the sample.

Example 4

The mechanical properties of samples comprising a cementitious material were investigated. More specifically, the compressive strength, Young's modulus and Poisson's ratio of different cement samples was investigated in the presence and in the absence of helical fibers within the cement composition. The samples were tested by BTT, as described in Example 1. Three different types of samples were tested, as follows: neat cement samples, cement samples containing 0.5 vol. % short fibers, and samples containing 0.5 vol. % long fibers, and the data is displayed in Table 10.

TABLE 10

| Sample # | Confining Pressure [psi] | Compressive Strength [psi] | Young's Modulus | Poisson's Ratio |
| --- | --- | --- | --- | --- |
| 73 | 0 | 9962 | 2.63e6 | 0.204 |
| 74 | 0 | 4184 | 1.31e6 | — |
| 75 | 0 | 3502 | 1.20e6 | 0.249 |

The compressive strength decreased for the cement samples containing helical fibers when compared to the neat cement samples, but Young's modulus also decreased by 54% for the cement samples containing long fibers when compared to the neat cement samples. While there is no value for Poisson's ratio for the short fiber samples, Poisson's ratio increased 22% for the cement samples containing long fibers when compared to the neat cement samples.

ADDITIONAL DISCLOSURE

A first embodiment, which is a method of servicing a wellbore in a subterranean formation comprising preparing a wellbore servicing fluid comprising a sealant material, helical fibers and a base fluid, placing the wellbore servicing fluid in the wellbore and/or subterranean formation, and allowing the wellbore servicing fluid to set therein.

A second embodiment, which is the method of the first embodiment wherein the sealant material comprises a cementitious material, a cementless material, or combinations thereof.

A third embodiment, which is the method of the second embodiment wherein the cementitious material comprises a hydraulic cement.

A fourth embodiment, which is the method of the second embodiment wherein the cementitious material comprises Portland cements, class A Portland cement, class B Portland cement, class C Portland cement, class G Portland cement, class H Portland cement; construction cements, type I construction cement, type II construction cement; pozzolanic cements; gypsum cements; shale cements; acid/base cements; phosphate cements, calcium phosphate cements; high alumina content cements; high alkalinity cements; magnesia cements; fly ash cements; zeolite cement systems; cement kiln dust cement systems; slag cements; micro-fine cements; metakaolin; silica cements, pumice, perlite, wollastonite, calcium silicate, tricalcium silicate, tricalcium metasilicate, amorphous silica, nano silica, rice husk ash; fluidized bed ash; magnesium oxychloride cements, Sorel cements; or combinations thereof.

A fifth embodiment, which is the method of the second embodiment wherein the cementless material comprises a latex sealant, a liquid rubber sealant, a latex, a resin sealant, an epoxy sealant, a silicone oil sealant, a polysiloxane, or combinations thereof.

A sixth embodiment, which is the method of one of the first through fifth embodiments wherein the helical fibers have an aspect ratio of from about 10 to about 100.

A seventh embodiment, which is the method of one of the first through sixth embodiments wherein the helical fibers comprise a right handed helix, a left handed helix, or combinations thereof.

An eighth embodiment, which is the method of one of the first through seventh embodiments wherein the helical fibers have a length of from about 0.01 inches to about 1 inch.

A ninth embodiment, which is the method of one of the first through eighth embodiments wherein the helical fibers have a diameter of from about 0.001 inches to about 0.3 inches.

A tenth embodiment, which is the method of one of the first through ninth embodiments wherein the helical fibers have a pitch of from about 0.01 inches to about 0.25 inches.

An eleventh embodiment, which is the method of one of the first through tenth embodiments wherein the helical fibers have from about 1 to about 50 pitches per inch of helix length, wherein the helix length is measured along the central axis of the helix.

A twelfth embodiment, which is the method of one of the first through eleventh embodiments wherein the helical fibers comprise metal fibers, aluminum fibers, metal alloy fibers, steel fibers, galvanized steel fibers, mineral fibers, ceramic fibers, stone wool fibers, glass fibers, glass fiber composites, thermoplastic fibers, plastic fibers, polypropylene fibers, polyethylene fibers, high-density polyethylene fibers, polyethylene terephthalate fibers, aramids (e.g., KEVLAR) fibers, Nylon 6,6 fibers, Rayon fibers, polyvinyl alcohol fibers, carbon fibers, carbon fiber composites, carbon nanofibers (e.g., carbon nanofiber bundles), resin fibers, epoxy-based fibers, resin/epoxy fibers, resin/epoxy composites, and the like, or combinations thereof.

A thirteenth embodiment, which is the method of one of the first through twelfth embodiments wherein the helical fibers are present in the wellbore servicing fluid in an amount of from about 0.1 vol. % to about 15 vol. %, based on the total volume of the wellbore servicing fluid.

A fourteenth embodiment, which is the method of one of the first through thirteenth embodiments wherein the base fluid comprises an aqueous-based fluid, an oil-based fluid, an emulsion, or an invert emulsion.

A fifteenth embodiment, which is the method of the fourteenth embodiment wherein the aqueous-based fluid comprises a brine.

A sixteenth embodiment, which is the method of one of the first through fifteenth embodiments wherein the base fluid is present in the wellbore servicing fluid in an amount of from about 40 wt. % to about 90 wt. %, based on the total weight of the wellbore servicing fluid.

A seventeenth embodiment, which is the method of one of the first through sixteenth embodiments wherein the wellbore servicing fluid optionally comprises suspending agents, density reducing additives, settling prevention agents, expansion additives, clays, salts, accelerants, set retarders, lignosulfonates, defoamers, surfactants, dispersing agents, fluid loss control agents, weighting materials, dispersants, fillers, zeolites, barite, calcium sulfate, silica flour, sand, slag, vitrified shale, fly ash, pozzolanic ash, lime, formation conditioning agents, fluid absorbing materials, resins, aqueous superabsorbers, viscosifying agents, gelling agents, crosslinkers, mechanical property modifying additives, elastomers, styrene-butadiene copolymers, conventional reinforcing materials, rebar, carbon fibers, glass fibers, metal fibers, minerals fibers, or combinations thereof.

A eighteenth embodiment, which is a method of servicing a wellbore in a subterranean formation comprising preparing a wellbore servicing fluid comprising a hydraulic cement, helical fibers and a base fluid; wherein the helical fibers have an aspect ratio of from about 10 to about 100, placing the wellbore servicing fluid in the wellbore and/or subterranean formation, and allowing the wellbore servicing fluid to set therein.

A nineteenth embodiment, which is the method of the eighteenth embodiment wherein the helical fibers comprise galvanized steel.

A twentieth embodiment, which is the method of one of the eighteenth through nineteenth embodiments wherein the helical fibers have (i) a length of from about 0.01 inches to about 1 inch; (ii) a diameter of from about 0.001 inches to about 0.3 inches; and (iii) a pitch of from about 0.01 inches to about 0.25 inches.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation comprising:
preparing a wellbore servicing fluid comprising a sealant material, helical fibers and a base fluid, wherein the helical fibers have an aspect ratio of from about 50 to about 90;
placing the wellbore servicing fluid in the wellbore and/or subterranean formation; and
allowing the wellbore servicing fluid to set therein, thereby yielding a hardened wellbore servicing fluid, wherein the hardened wellbore servicing fluid is characterized by a toughness of from about 0.1 in·lbf/in$^3$ to about 100 in·lbf/in$^3$.

2. The method of claim 1 wherein the sealant material comprises a cementitious material, a cementless material, or combinations thereof.

3. The method of claim 2 wherein the cementitious material comprises a hydraulic cement.

4. The method of claim 2 wherein the cementitious material comprises Portland cements, class A Portland cement, class B Portland cement, class C Portland cement, class G Portland cement, class H Portland cement; construction cements, type I construction cement, type II construction cement; pozzolanic cements; gypsum cements; shale cements; acid/base cements; phosphate cements, calcium phosphate cements; high alumina content cements; high alkalinity cements; magnesia cements; fly ash cements; zeolite cement systems; cement kiln dust cement systems; slag cements; micro-fine cements; metakaolin; silica cements, pumice, perlite, wollastonite, calcium silicate, tricalcium silicate, tricalcium metasilicate, amorphous silica, nano silica, rice husk ash; fluidized bed ash; magnesium oxychloride cements, Sorel cements; or combinations thereof.

5. The method of claim 2 wherein the cementless material comprises a latex sealant, a liquid rubber sealant, a latex, a resin sealant, an epoxy sealant, a silicone oil sealant, a polysiloxane, or combinations thereof.

6. The method of claim 1 wherein the helical fibers comprise a right handed helix, a left handed helix, or combinations thereof.

7. The method of claim 1 wherein the helical fibers have a length of from about 0.01 inches to about 1 inch.

8. The method of claim 1 wherein the helical fibers have a diameter of from about 0.001 inches to about 0.3 inches.

9. The method of claim 1 wherein the helical fibers have a pitch of from about 0.01 inches to about 0.25 inches.

10. The method of claim 1 wherein the helical fibers have from about 1 to about 50 pitches per inch of helix length, wherein the helix length is measured along the central axis of the helix.

11. The method of claim 1 wherein the helical fibers comprise metal fibers, aluminum fibers, metal alloy fibers, steel fibers, galvanized steel fibers, mineral fibers, ceramic fibers, stone wool fibers, glass fibers, glass fiber composites, thermoplastic fibers, plastic fibers, polypropylene fibers, polyethylene fibers, high-density polyethylene fibers, polyethylene terephthalate fibers, aramids (e.g., KEVLAR) fibers, Nylon 6,6 fibers, Rayon fibers, polyvinyl alcohol fibers, carbon fibers, carbon fiber composites, carbon nanofibers (e.g., carbon nanofiber bundles), resin fibers, epoxy-based fibers, resin/epoxy fibers, resin/epoxy composites, and the like, or combinations thereof.

12. The method of claim 1 wherein the helical fibers are present in the wellbore servicing fluid in an amount of from about 0.1 vol. % to about 15 vol. %, based on the total volume of the wellbore servicing fluid.

13. The method of claim 1 wherein the base fluid comprises an aqueous-based fluid, an oil-based fluid, an emulsion, or an invert emulsion.

14. The method of claim 13 wherein the aqueous-based fluid comprises a brine.

15. The method of claim 1 wherein the base fluid is present in the wellbore servicing fluid in an amount of from about 40 wt. % to about 90 wt. %, based on the total weight of the well bore servicing fluid.

16. The method of claim 1 wherein the wellbore servicing fluid optionally comprises suspending agents, density reducing additives, settling prevention agents, expansion additives, clays, salts, accelerants, set retarders, lignosulfonates, defoamers, surfactants, dispersing agents, fluid loss control agents, weighting materials, dispersants, fillers, zeolites, barite, calcium sulfate, silica flour, sand, slag, vitrified shale, fly ash, pozzolanic ash, lime, formation conditioning agents, fluid absorbing materials, resins, aqueous superabsorbers, viscosifying agents, gelling agents, crosslinkers, mechanical property modifying additives, elastomers, styrene-butadiene copolymers, conventional reinforcing materials, rebar, carbon fibers, glass fibers, metal fibers, minerals fibers, or combinations thereof.

17. A method of servicing a wellbore in a subterranean formation comprising:
preparing a wellbore servicing fluid comprising a hydraulic cement, helical fibers and a base fluid;
wherein the helical fibers have an aspect ratio of from about 50 to about 90;
placing the well bore servicing fluid in the wellbore and/or subterranean formation; and
allowing the wellbore servicing fluid to set therein, thereby yielding a hardened wellbore servicing fluid, wherein the hardened wellbore servicing fluid is characterized by a toughness of from about 0.1 in·lbf/in$^3$ to about 100 in·lbf/in$^3$.

18. The method of claim 17 wherein the helical fibers comprise galvanized steel.

19. The method of claim 17 wherein the helical fibers have (i) a length of from about 0.01 inches to about 1 inch; (ii) a diameter of from about 0.001 inches to about 0.3 inches; and (iii) a pitch of from about 0.01 inches to about 0.25 inches.

* * * * *